United States Patent [19]
Martin

[11] 3,778,956
[45] Dec. 18, 1973

[54] GLASS PANE FASTENING
[76] Inventor: Richard W. Martin, 25 Corte St., North Easton, Mass. 02116
[22] Filed: May 12, 1971
[21] Appl. No.: 142,512

[52] U.S. Cl. .............................. 287/189.36 D, 85/1
[51] Int. Cl. ............................................. F16b 5/02
[58] Field of Search .......................... 187/189.36 D; 85/1 R, 1 L

[56] References Cited
UNITED STATES PATENTS
759,608   5/1904   Harper .................... 287/189.36 D
895,356   8/1908   Fells ....................... 287/189.36 D
FOREIGN PATENTS OR APPLICATIONS
1,229,969   3/1960   France ................................ 85/1 L Primary Examiner—Dave W. Arola
Assistant Examiner—Wayne L. Shedd
Attorney—Charles Hieken

[57] ABSTRACT

Large adjacent glass panes are fastened together by means including a glazing button comprising a stem that is preferably thinner than the glass to be joined coacting with two shoulder portions to define a pair of recesses slightly larger than the thickness of the adjacent glass panes to be connected. At least one of the shoulder-defining portions is threaded for receiving a member with an internally threaded socket that may be tightened to securely interconnect the adjacent panes of glass.

9 Claims, 8 Drawing Figures

PATENTED DEC 18 1973 3,778,956

INVENTOR.
RICHARD W. MARTIN
BY
Charles Hieken
ATTORNEY

GLASS PANE FASTENING

BACKGROUND OF THE INVENTION

The present invention relates in general to interconnecting glass panes and more particularly concerns novel apparatus and techniques for joining large floor-to-ceiling panes of glass in a manner that facilitates their interconnection while materially reducing the costs of fabrication.

A feature of modern architecture is the use of large glass areas to provide an expansive view. Typically such glass walls comprise adjacent large glass panes that are notched at intervals along edges to be joined for receiving clamps that may be bolted together to secure adjacent glass panes together. The gap between the pane is then filled with suitable bonding and sealing material. A serious disadvantage with such techniques is the great cost of forming the notches in the edges of the glass panes. Still another problem is in vertically aligning the notches in contiguous panels. And still another disadvantage is a requirement that the interconnecting clamps be located vertically where the notches are located. If in a particular location interconnecting elements would be better located at different vertical heights for esthetic or structural reasons, it is not possible to do it with the prior art approach unless specially notched panes are used.

Accordingly, it is an important object of this invention to provide methods and means for interconnecting glass panes.

It is a further object of the invention to achieve the preceding object while overcoming one or more of the disadvantages described above.

It is a further object of the invention to achieve one or more of the preceding objects with unnotched glass panes.

It is a further object of the invention to achieve one or more of the preceding objects with hardware that is attractive and may be positioned vertically virtually anywhere.

It is a further object of the invention to achieve one of more of the preceding objects with hardware that securely holds adjacent panes in place.

SUMMARY OF THE INVENTION

According to the invention, there is means defining first and second recesses for accommodating the edges of adjacent glass panels with the means defining the recesses preferably separating them by less than the width of the recess in a direction along the thickness of the glass panes to be interconnected. Preferably there are means for clamping the panes of glass to be interconnected thereby. Preferably the means for clamping include the means defining the recesses threaded at least on one end and arranged for accommodating means defining a threaded socket that may be rotated to perform the clamping function.

According to one aspect of the invention, the means defining the socket is annular and formed with openings for accommodating a tightening wrench. According to one embodiment of the invention both ends of the means defining the recesses are threaded and accept respective means defining the threaded sockets. According to another aspect of the invention, only one end is threaded, the other end carrying a permanently affixed cap.

Numerous other features, objects and advantages of the invention will become apparent from the following specification when read in connection with the accompanying drawing in which:

DETAILED DESCRIPTION OF PREFERRED EMBODIMENTS

Figure 1:
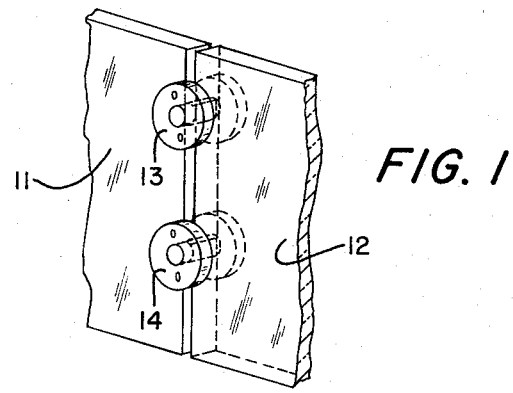
FIG. 1 is a perspective view illustrating how glazing buttons according to the invention may interconnect large panes of glass.

With reference now to the drawing and more particularly FIG. 1 thereof, there is shown a perspective view of portions of adjacent panes of glass 11 and 12 having adjacent opposed edge surfaces free of notches interconnected side-by-side in the same plane by means including glazing buttons 13 and 14 according to the invention. Glazing buttons 13 and 14 clamp panes 11 and 12 together to secure them in place. Thereafter the gap between panes 11 and 12 may be filled with an epoxy or other suitable material to provide a good seal, and, if desired, help glazing buttons 13 and 14 support the panes.

Figure 2:
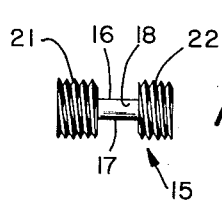
FIGS. 2 and 3 are top and side views respectively of an embodiment of the invention threaded at both ends.
Figure 3:
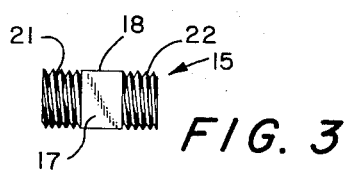

Referring to FIGS. 2-5, there is shown one embodiment of glazing buttons 13 and 14. FIGS. 2 and 3 are top and side views, respectively, of an element 15 defining a first recess 16 and a second recess 17 for accommodating portions of panes such as 11 and 12 adjacent their opposed edges that are separated by midwall 18. Midwall 18 is symmetrically located between threaded end portions 21 and 22. The recesses 16 and 17 are bounded by opposed flat surfaces parallel to each other at each end of the length of the recesses and perpendicular to the length of the recesses for contact with panes 11 and 12. Washers, such as 23, help define these flat surfaces.

Figure 4:
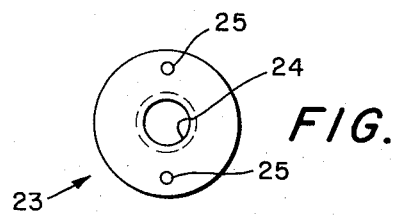
FIGS. 4 and 5 are plan and side views, respectively, of an annular cap formed with a threaded internal socket.
Figure 5:
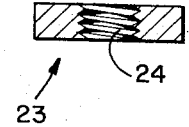

FIGS. 4 and 5 are top and side views, respectively, of an annular washer 23 formed with a threaded socket 24 for mating engagement with threaded ends 21 and 22. Annular washer 24 is also formed with diametrically opposed recesses 25 for mating engagement with the studs of an appropriate wrench.

Figure 7:
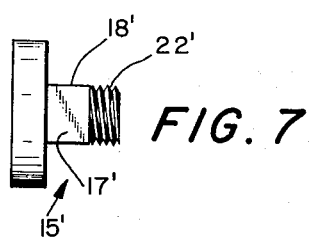
FIGS. 6, 7 and 8 are top, side and front views, respectively, of another embodiment of the invention having only one end threaded.
Figure 6:
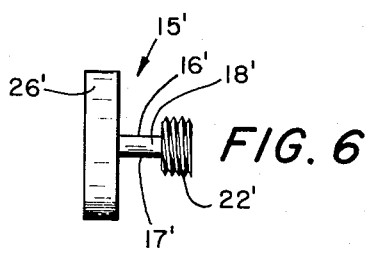
Figure 8:
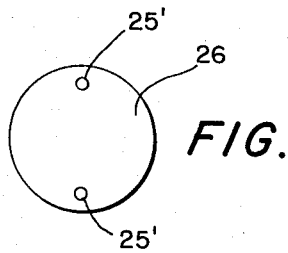

Referring to FIGS. 6-8, there is shown another embodiment of the invention. FIGS. 6 and 7 show top and side views respectively of an element formed with recesses 16' and 17' separated by midwall 18' but having only end 22' threaded. The other end is a disc 26' that may be permanently attached to midwall 18'. FIG. 8 is a front view of the element showing disc 26' formed with openings 25' for receiving the studs of a tightening wrench. Washer 23 may be screwed on end 22' to complete the assembly.

The particular dimensions may be adjusted for specific applications. The length of the recesses should be slightly greater than the thickness of the panes of glass to be interconnected. The thickness of midwall 18 is preferably less than its height and the depth of each of the recesses. The outside diameter of the disc and washer is greater than the height of the midwall.

The glazing buttons may be made of many different types of material. They may be made of metal, plastic, glass or combinations thereof. A feature of the invention is that the glazing buttons may be made esthetically pleasing.

The method according to the invention includes seating the adjacent edges of panels to be interconnected in respective recesses of an element. Then the washers are screwed on and tightened to firmly clamp the panes together.

Numerous techniques may be used to locate the edges of the panes to be connected in the recesses. The panes may first be positioned about where desired and the glazing buttons placed in the gap between the adjacent panes, then mounting and tightening washers. The glazing buttons may first be positioned and the panes moved into the recesses. A glazing button might be seated on the edge of one pane and that pane moved relative to the adjacent pane to be connected. Numerous other techniques will be apparent to those skilled in the art.

The specific structure of the glazing buttons may be varied within the principles of the invention. Although there has been described the best mode now contemplated for practicing the invention, those skilled in the art may consider other specific structures embracing a stem in the gap between the edges of adjacent panes of glass and means attached to the stem for clamping against opposed surfaces of the glass adjacent the edges to interconnect the adjacent panes of glass.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed.

What is claimed is:

1. Glass pane interconnecting apparatus for interconnecting adjacent glass panes side-by-side in the same plane having opposed adjacent edge surfaces free of notches comprising,
    means defining first and second recesses of length slightly longer than the thickness of adjacent glass panes to be interconnected,
    said means including opposed flat surfaces parallel to each other at each end of said length and perpendicular to said length for contact with said panes,
    and clamping means attached to said first-mentioned means for clamping opposed surfaces of glass panes seated in said recesses together near the opposed edges of said glass panes for interconnecting said glass panes side-by-side in the same plane.

2. Glass pane interconnecting apparatus in accordance with claim 1 and further comprising,
    said glass panes seated in said recesses and clamped by said clamping means.

3. Glass interconnecting apparatus in accordance with claim 2 and further comprising at least another of said first-mentioned means seated in the gap between said glass panes having an associated one of said clamping means.

4. Glass interconnecting apparatus in accordance with claim 1 wherein said first-mentioned means comprises a midwall that is higher than it is thick and is seated between said clamping means.

5. Glass pane interconnecting apparatus in accordance with claim 4 wherein said clamping means comprises at least one threaded end and fastening means formed with a threaded socket screwably connected to said at least one end.

6. Glass pane interconnecting apparatus in accordance with claim 5 wherein said first-mentioned means and said clamping means comprises a disc secured to the other end of said midwall in cross section forming the cap of a T.

7. Glass pane interconnecting apparatus in accordance with claim 4 wherein the depth of said recess is greater than the thickness of said midwall.

8. Glass pane interconnecting apparatus in accordance with claim 5 wherein said fastening means comprises an annular disc of inside diameter corresponding substantially to the diameter of said threaded end and of outside diameter greater than the height of said midwall.

9. Glass pane interconnecting apparatus in accordance with claim 6 wherein said fastening means comprises an annular disc of inside diameter corresponding substantially to the diameter of said threaded end and of outside diameter greater then the height of said midwall,
    the outside diameter of said first-mentioned disc being greater than the height of said midwall.

* * * * *